May 31, 1960 W. D. BUCKINGHAM ET AL 2,938,721

COPY SHEET STORAGE AND FEED MECHANISM

Filed March 15, 1957 12 Sheets-Sheet 1

INVENTORS
W. D. BUCKINGHAM
G. H. RIDGE
L. D. ROOT
F. T. TURNER

BY

*[signature]* Presson

ATTORNEY

COPY SHEET STORAGE AND FEED MECHANISM

Filed March 15, 1957

12 Sheets-Sheet 2

INVENTORS
W. D. BUCKINGHAM
G. H. RIDGE
L. D. ROOT
F. T. TURNER
BY
N F Presson
ATTORNEY

COPY SHEET STORAGE AND FEED MECHANISM

Filed March 15, 1957 12 Sheets-Sheet 3

INVENTORS
W. D. BUCKINGHAM
G. H. RIDGE
L. D. ROOT
F. T. TURNER
BY
[signature] Presson
ATTORNEY INVENTORS
W. D. BUCKINGHAM
G. H. RIDGE
L. D. ROOT
F. T. TURNER
BY
[signature]
ATTORNEY

INVENTORS
W. D. BUCKINGHAM
G. H. RIDGE
L. D. ROOT
F. T. TURNER

BY [signature]
ATTORNEY

May 31, 1960 W. D. BUCKINGHAM ET AL 2,938,721

COPY SHEET STORAGE AND FEED MECHANISM

Filed March 15, 1957 12 Sheets-Sheet 6

BY

INVENTORS
W. D. BUCKINGHAM
G. H. RIDGE
L. D. ROOT
F. T. TURNER

ATTORNEY

INVENTORS
W. D. BUCKINGHAM
G. H. RIDGE
BY L. D. ROOT
F. T. TURNER
ATTORNEY

INVENTORS
W. D. BUCKINGHAM
G. H. RIDGE
L. D. ROOT
F. T. TURNER
BY
ATTORNEY

INVENTORS
W. D. BUCKINGHAM
G. H. RIDGE
L. D. ROOT
F. T. TURNER
BY
[signature]
ATTORNEY

INVENTORS
W. D. BUCKINGHAM
G. H. RIDGE
L. D. ROOT
F. T. TURNER

ATTORNEY

May 31, 1960 W. D. BUCKINGHAM ET AL 2,938,721

COPY SHEET STORAGE AND FEED MECHANISM

Filed March 15, 1957 12 Sheets-Sheet 11

INVENTORS
W. D. BUCKINGHAM
G. H. RIDGE
L. D. ROOT
F. T. TURNER

BY

ATTORNEY

COPY SHEET STORAGE AND FEED MECHANISM

Filed March 15, 1957 12 Sheets-Sheet 12

INVENTORS
W. D. BUCKINGHAM
G. H. RIDGE
L. D. ROOT
F. T. TURNER
BY
W. F. Presson
ATTORNEY 2,938,721

COPY SHEET STORAGE AND FEED MECHANISM

William D. Buckingham, Southampton, Guy H. Ridge, Water Mill, Lawrence D. Root, Southampton, and Frank T. Turner, Hampton Bays, N.Y., assignors to The Western Union Telegraph Company, New York, N.Y., a corporation of New York Filed Mar. 15, 1957, Ser. No. 646,442

10 Claims. (Cl. 271—41)

This invention relates to copy sheet storage mechanism and associated feed mechanism for causing letters, telegrams or other message copy sheets to be advanced through a sheet-receiving device automatically in succession from the storage stack of such copy sheets, and also to facsimile transmitting apparatus embodying such storage and automatic sheet-feeding mechanisms.

The desirability of a facsimile transmitter in which a number of letters, messages or other copy sheets can be advanced automatically one at a time and in proper order through the transmitter has long been recognized. Heretofore it has been proposed to mount the various copy sheets on a moving belt which carried them successively past the scanning line position of a transmitter, or to wrap the copy sheets around cylinders or drums which were successively fed into the transmitter for circular scanning, or to feed copy sheets one at a time to a cylindrical former device for scanning the rolled sheets. None of these methods, however, enables a plurality of copy sheets to be stacked in a pile on a loading table and successively gripped and advanced through the transmitter in a desired sequence. It is, moreover, essential to obviate the possibility of two or more superposed copy sheets from being advanced concurrently since this would result in failure to transmit the message on one or more of the copy sheets with the attendant unfortunate delay or loss of messages to be transmitted.

In accordance with the objects of the instant invention the superposed copy sheets are disposed alternately with pressure bars in a stack on the loading table and the copy sheets have the leading ends thereof successively gripped and advanced automatically by a feed roll and the pressure bars which successively are moved over the feed rolls to exert sheet-feeding pressure in such manner that it is not possible for two or more sheets in a stack to be gripped and advanced simultaneously or concurrently through the associated sheet-receiving device, for example, a facsimile transmitter, notwithstanding static attraction or adhesive or frictional forces that may be present or exerted between adjoining sheets. The sheets normally are advanced in the order in which they are disposed in the stack, but the device also enables a copy sheet, for example, a sheet bearing a priority message, to be inserted at any time for immediate advancement through the device upon completion of the message currently being transmitted, and regardless of the number of other message copy sheets in the stack awaiting advancement. Moreover, in accordance with the preferred form of the invention the various copy sheets may be of different sizes and composed either of thick, thin, or intermediate weight stock either flexible or inflexible, and including cardboard and the like, since flat-bed viewing or scanning is provided and it is not necessary to roll or otherwise deform the sheets.

It it not necessary for a clerk or other person to remain at the transmitter or other device; when a stack of message copy sheets have been properly placed on the loading table, the operation of the apparatus automatically advances the copy sheets or messages in proper succession to the associated device for facsimile scanning or other operation, after which the copy sheets are delivered to a bin which in the case of a facsimile transmitter is referred to as a "sent message" bin. Additional copy sheets may be placed on top of the remaining sheets in the stack at any time and will be advanced in proper order or, as above mentioned, may be inserted ahead of the remaining sheets for priority transmission.

The foregoing and other objects and advantages of the invention will be apparent from the following detailed description of an illustrative embodiment thereof operatively associated with a facsimile transmitter, taken in connection with the accompanying drawings, in which:

Fig. 1 is a schematic diagram showing the relative positions of the copy loader, scanner and paper feed units of a facsimile transmitter;

Fig. 2 diagrammatically shows a cycle of operation of the pressure bars in relation to the initial feed roller of the copy sheet gripping and advancing mechanism;

Figure 13:
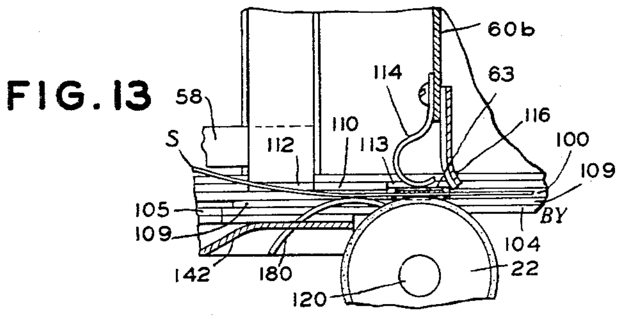
Figure 5:
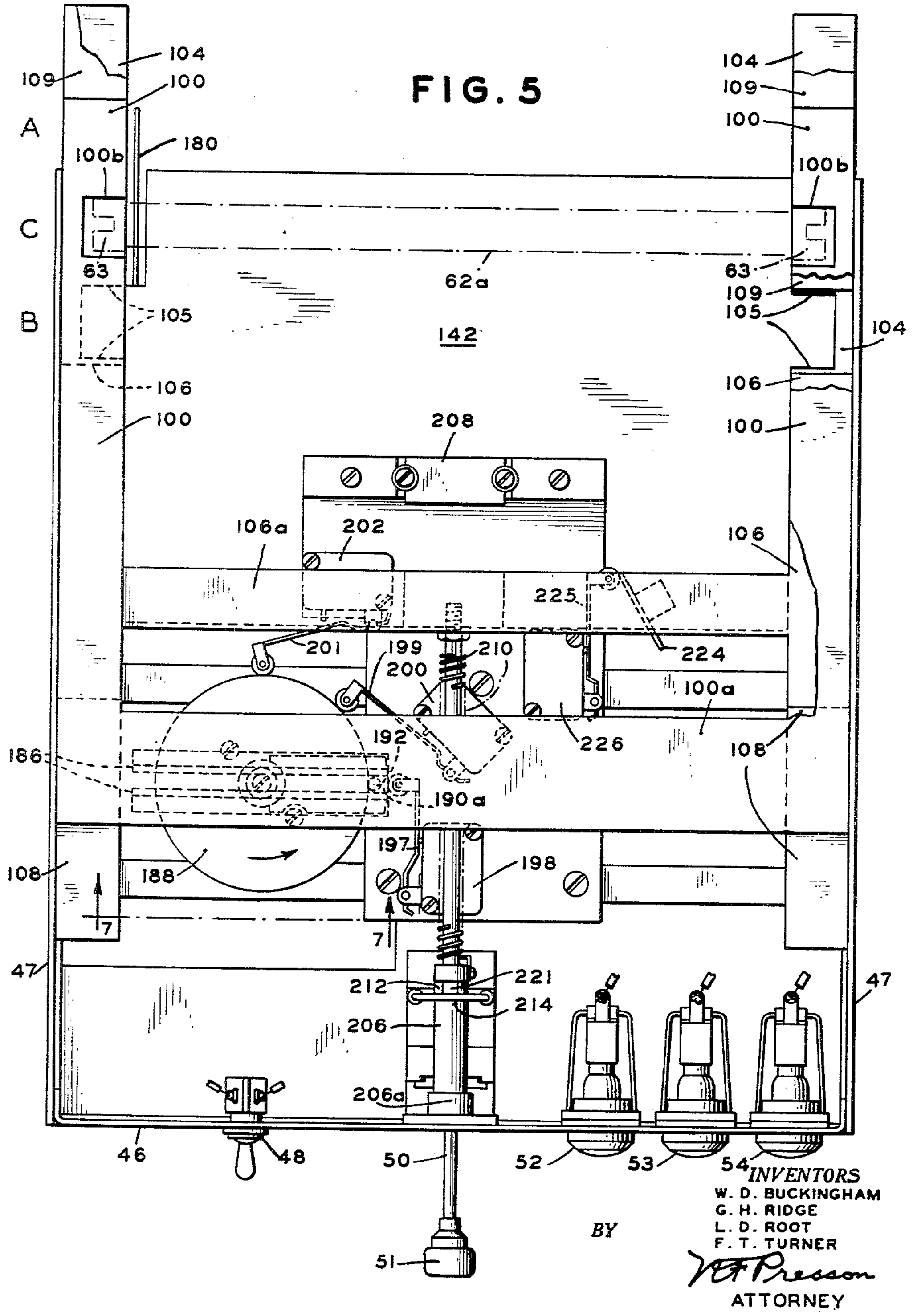
Fig. 5 is a plan view of the copy sheet feeding mechanism of Fig. 3, with the protective cover removed.
Figures 6, 6A, 6B, 7:
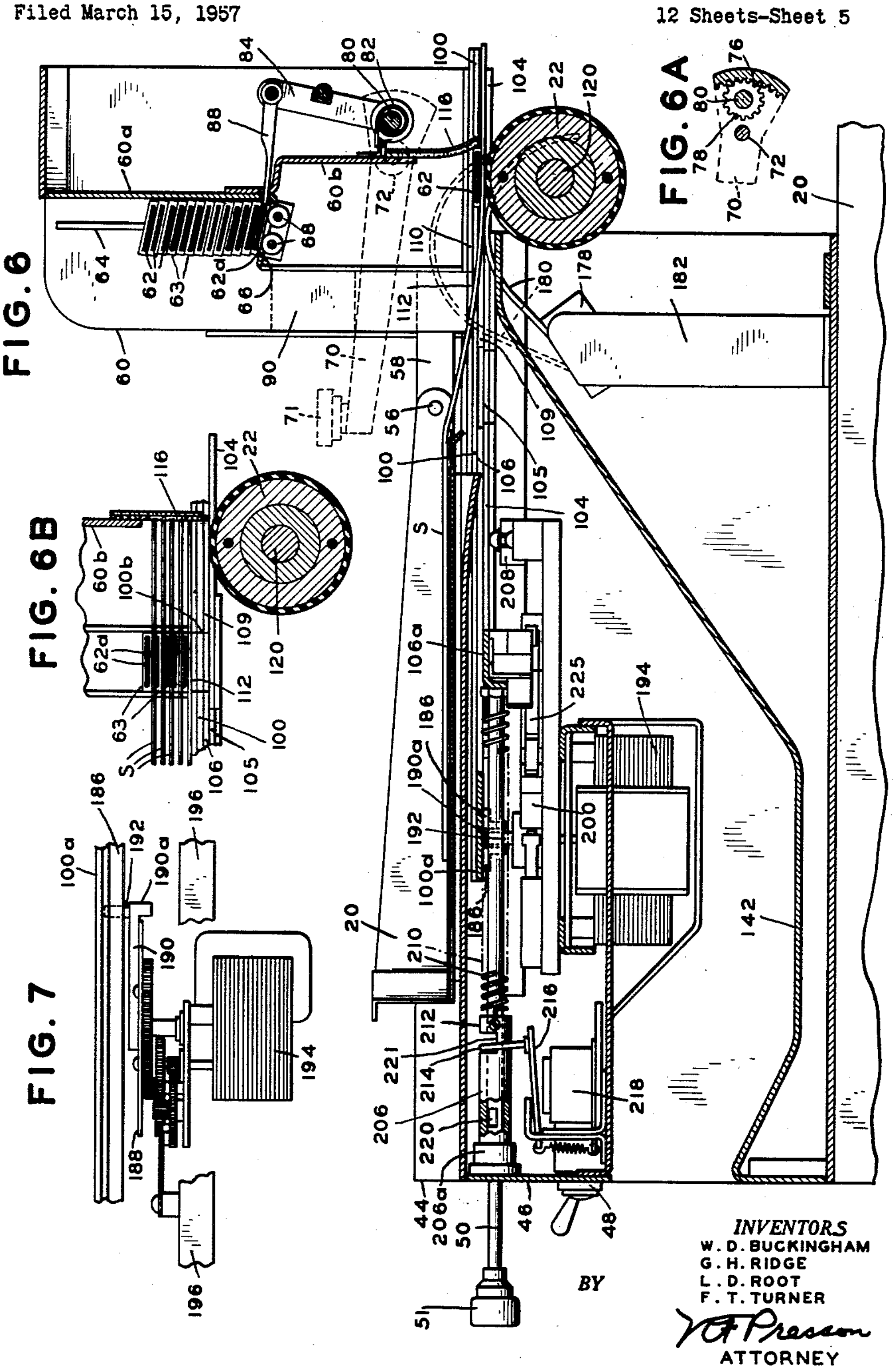
Fig. 6 is a sectional view taken along the line 6—6 of Fig. 3.
Fig. 6A is a detail of gear structure employed in ejecting the pressure bars successively as copy sheets are inserted in the loading table.
Figure 8:
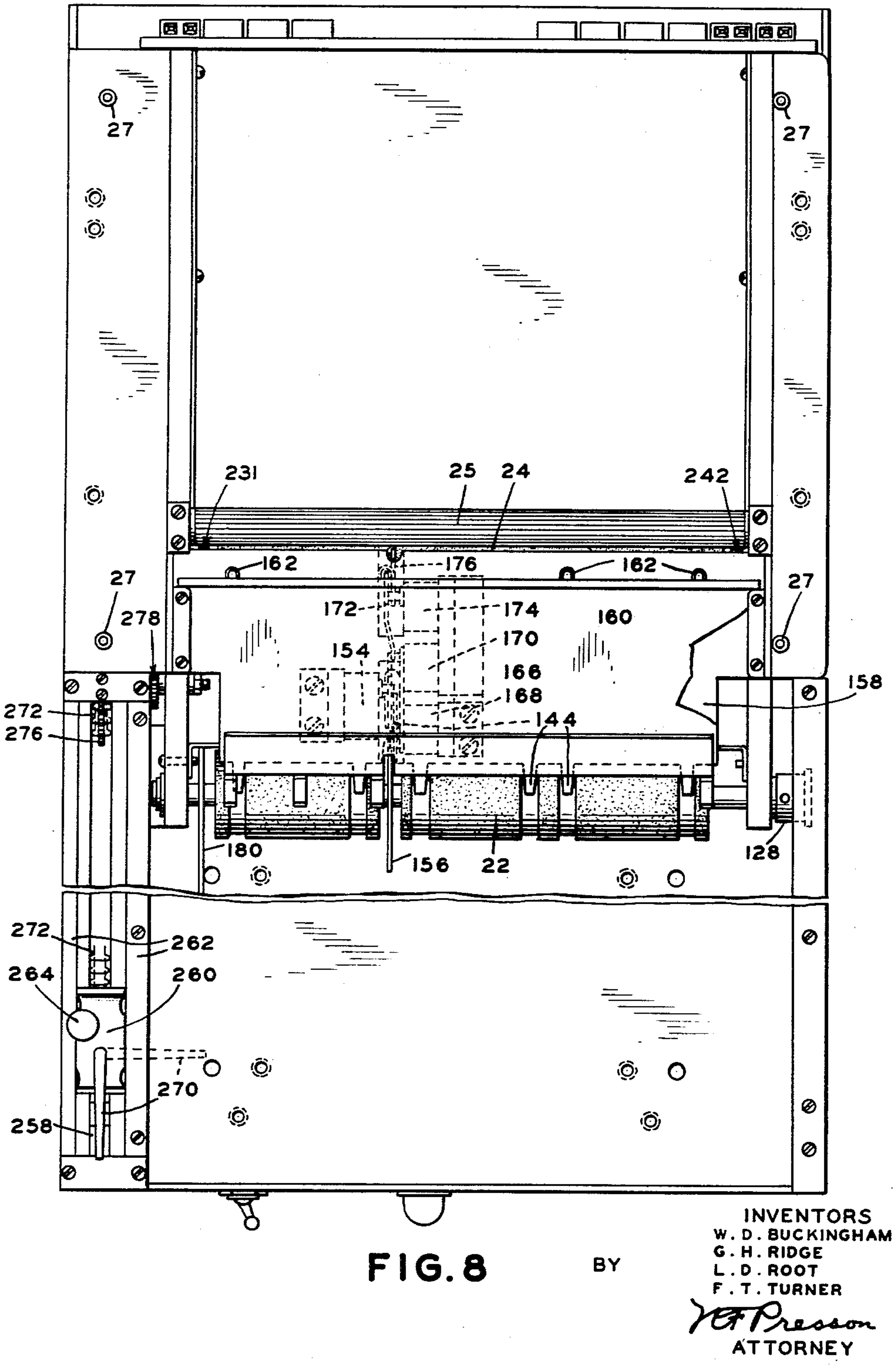
Figure 9:
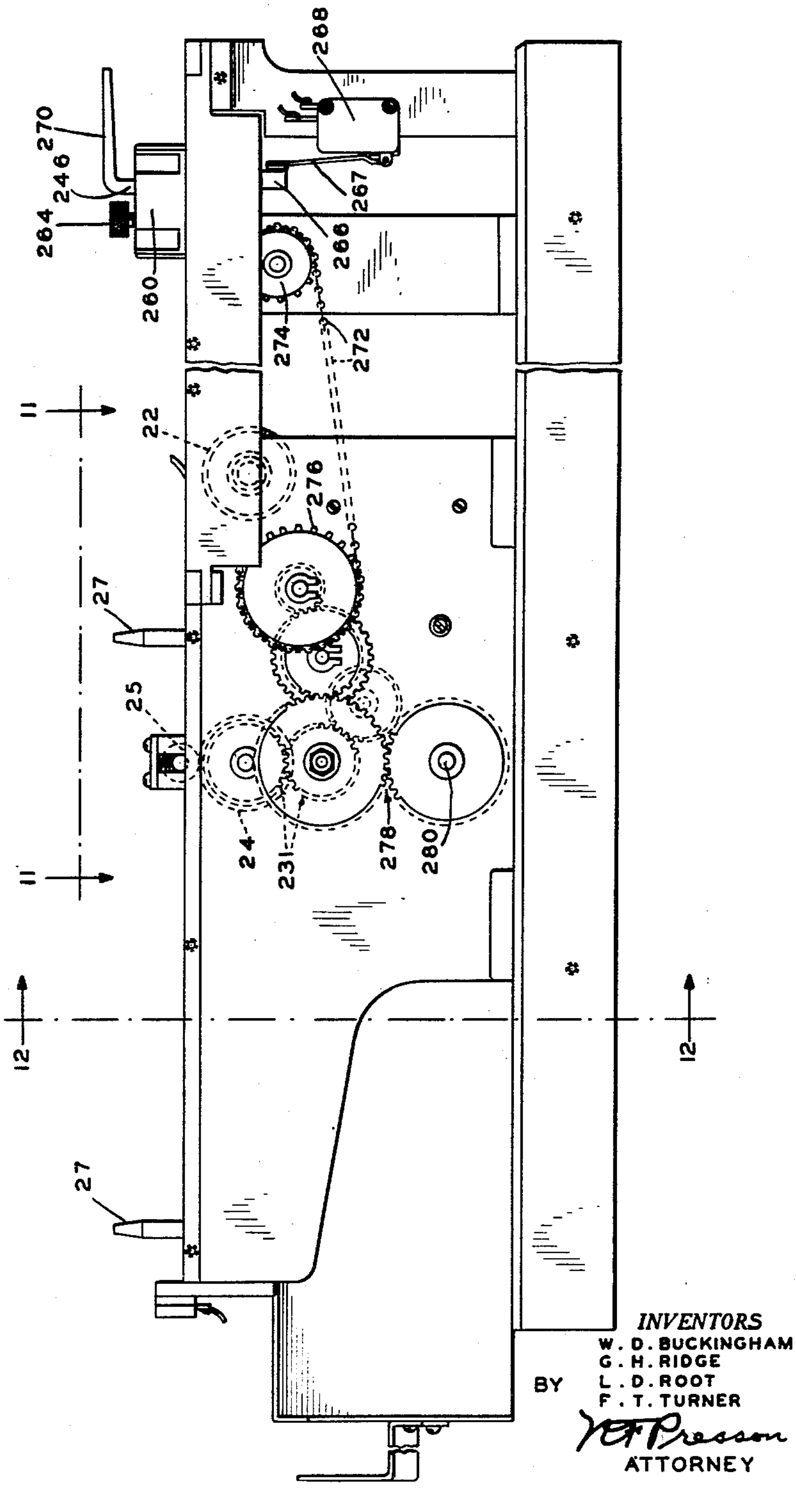
Figure 10:
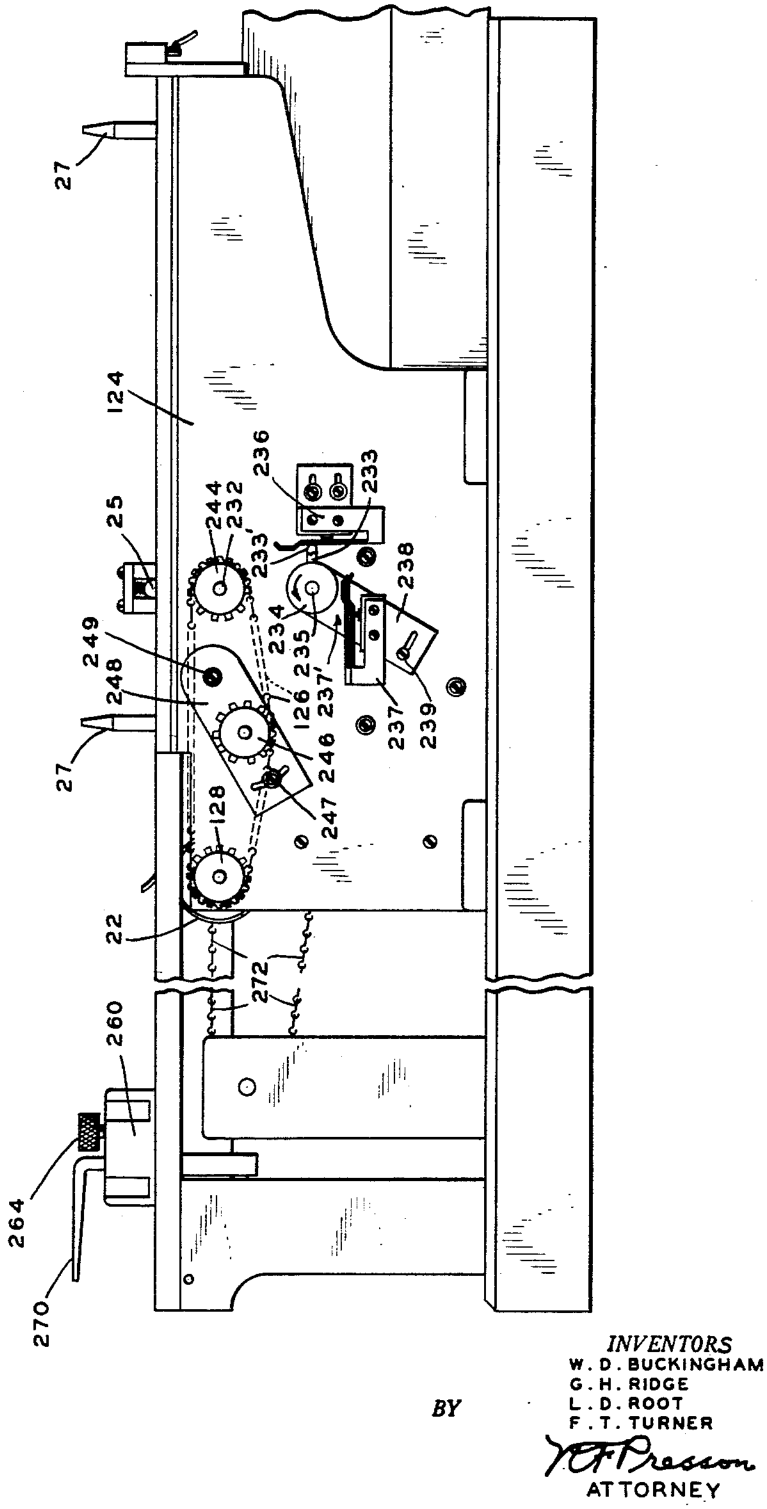
Figure 11:
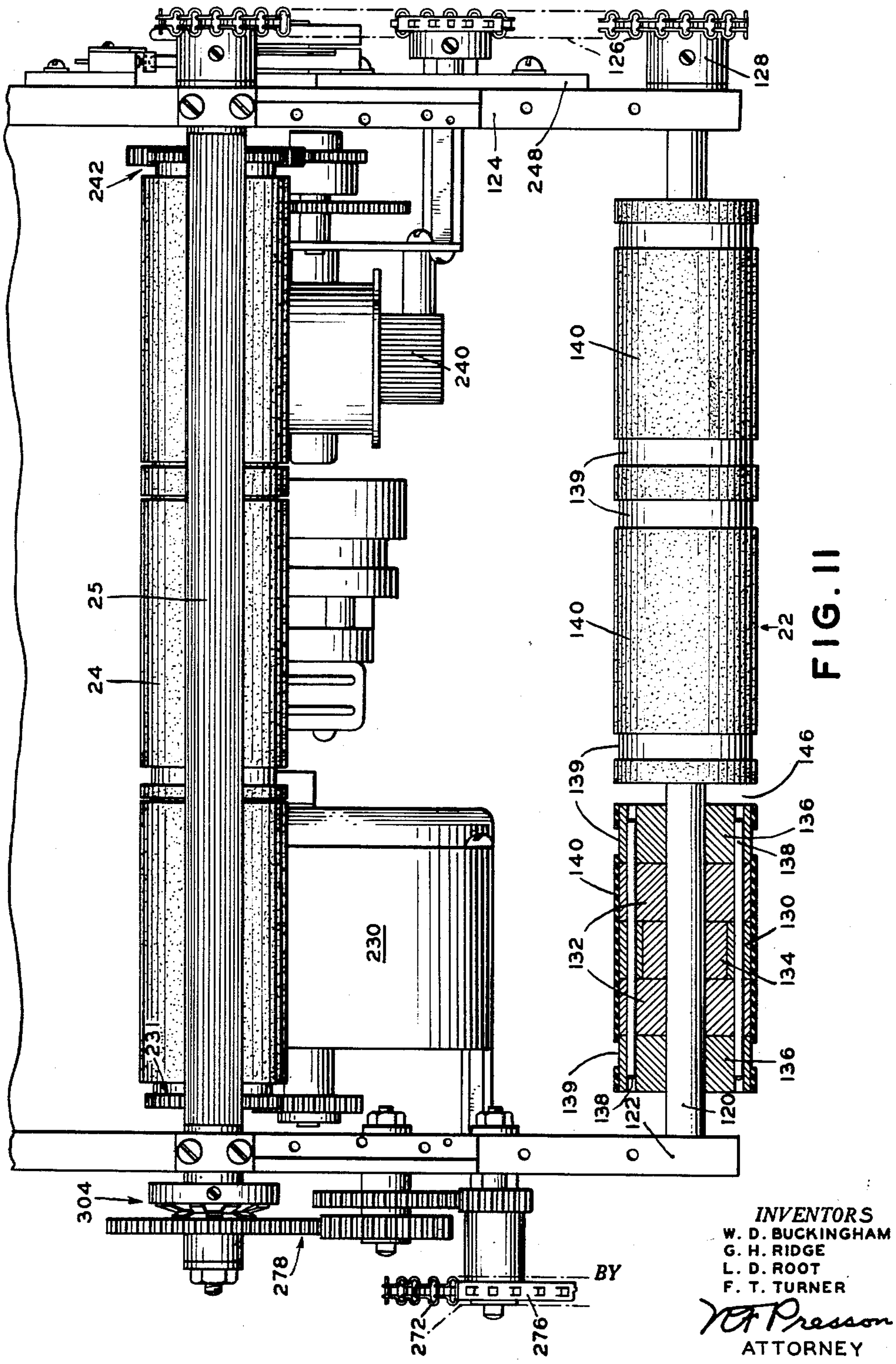
Figure 12:
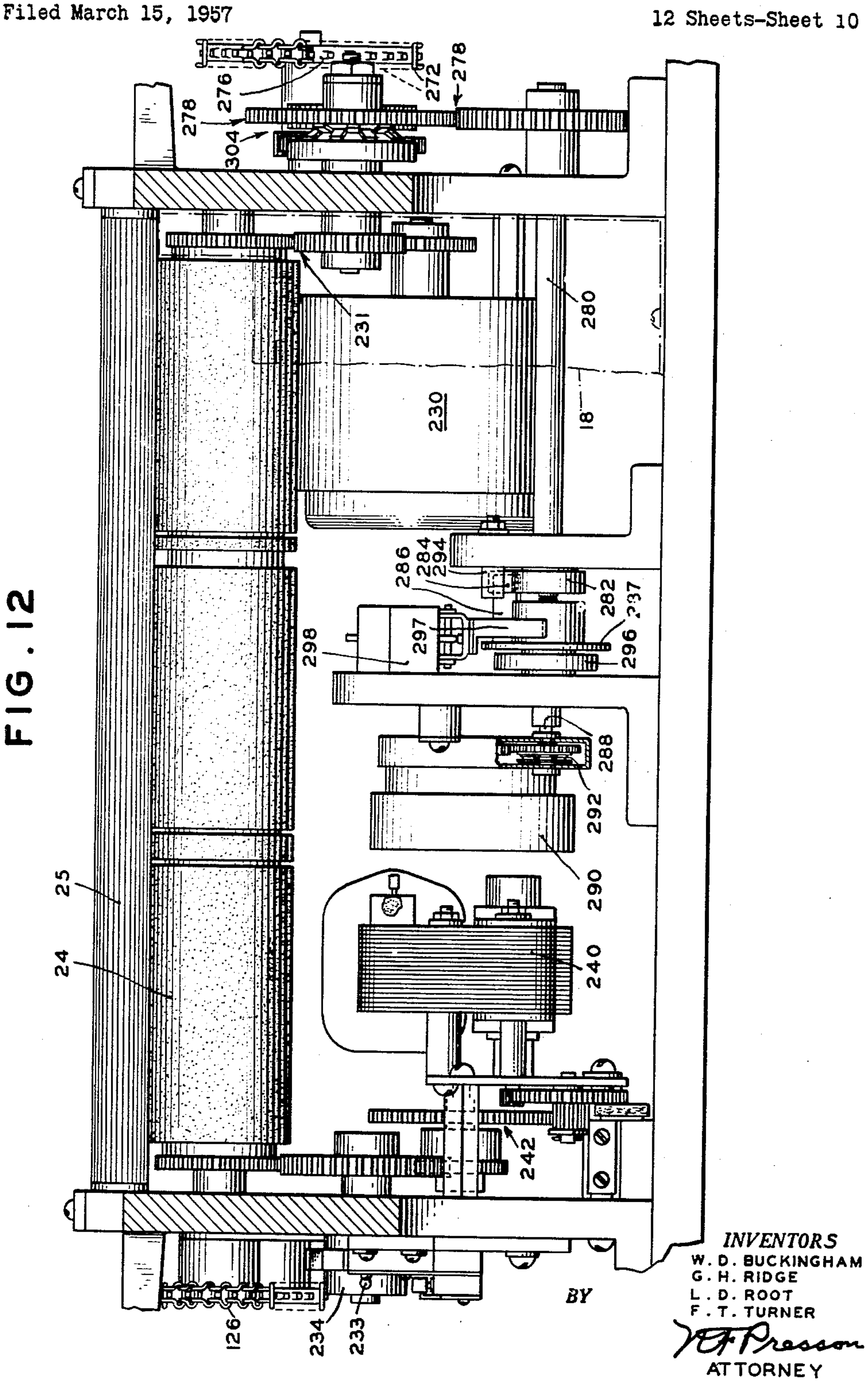
Figure 14:
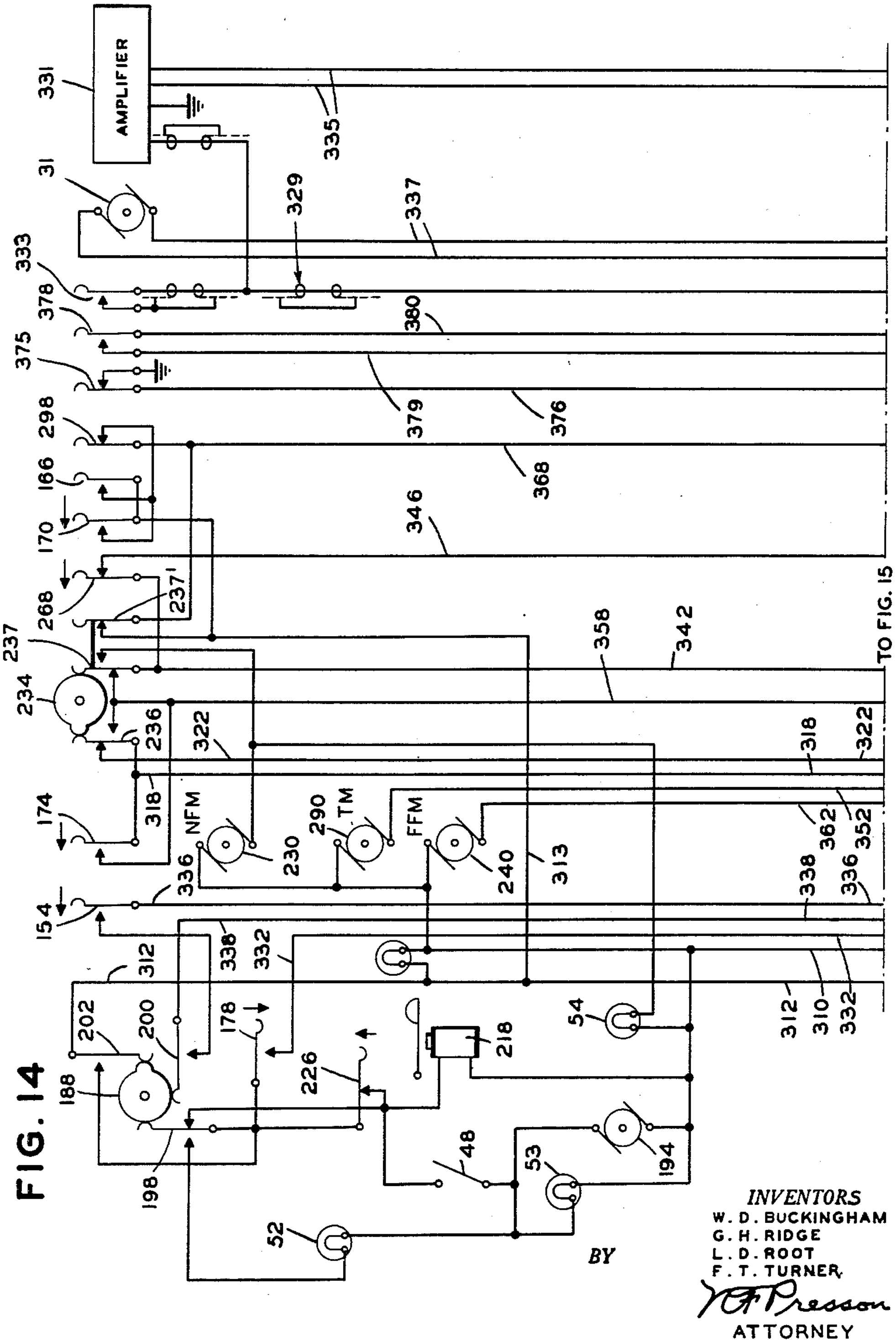
Figure 15:
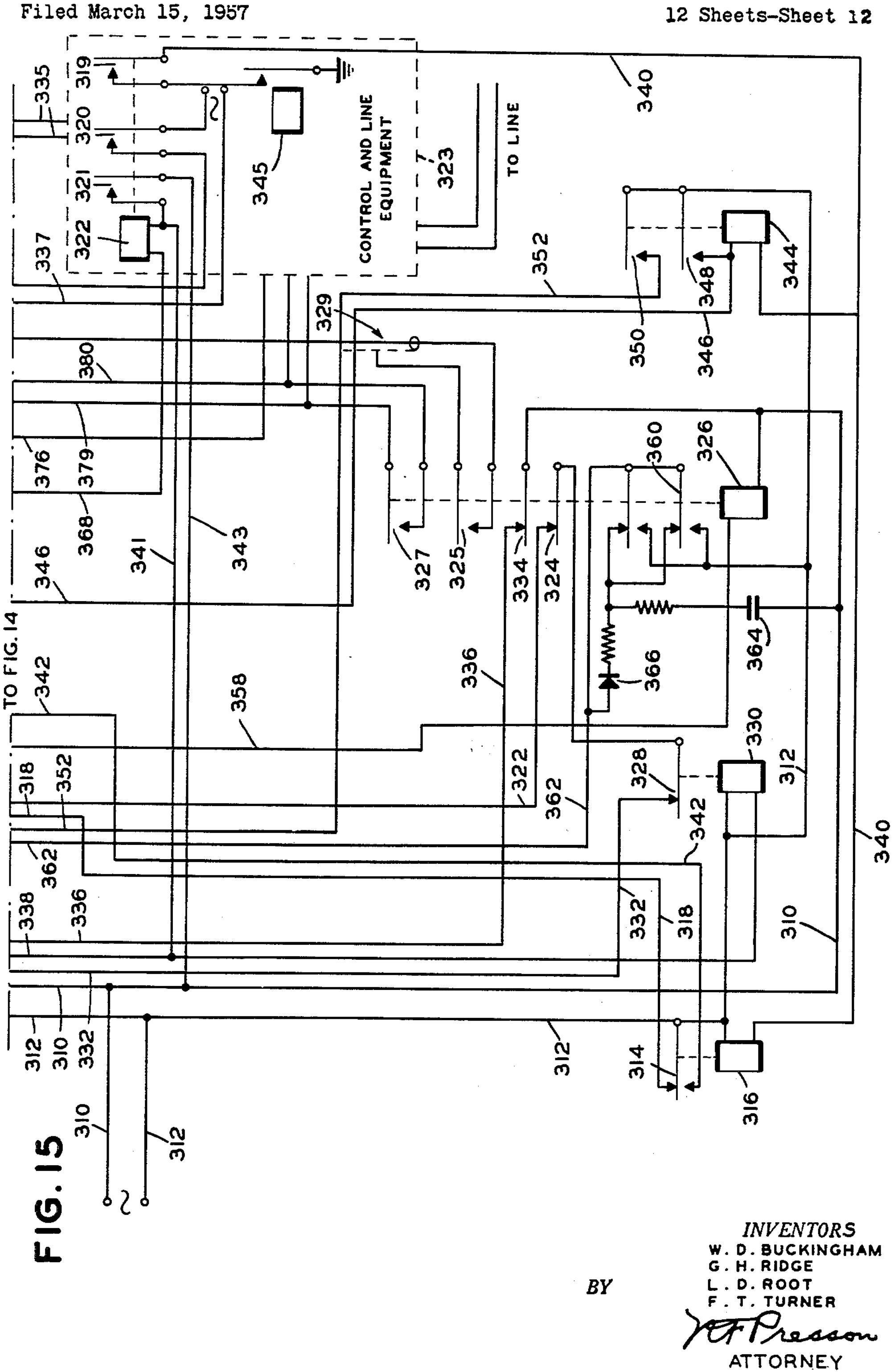

Fig. 6B diagrammatically shows a stack of copy sheets with interposed steel pressure bars for causing the sheets successively to be advanced from the loading table through the transmitter;

Fig. 7 is a sectional view taken along the line 7—7 of Fig. 5, showing certain details of motor-driven copy feed mechanism;

Fig. 8 is a plan view showing certain details of the paper feed unit;

Fig. 9 is a view in elevation of the left hand side of the paper feed unit as seen in Fig. 8;

Fig. 10 is a view in elevation of the right hand side of Fig. 8;

Fig. 11 is an enlarged plan view of paper feed rolls, looking in the direction of the arrows 11—11 on Fig. 9;

Fig. 12 is an enlarged sectional view taken along the line 12—12 of Fig. 9;

Fig. 13 shows a modified form of structure for causing a pressure bar to exert sheet-feeding pressure on the underlying copy sheet and feed roll; and Figs. 14 and 15 together comprise a wiring diagram of certain control and line connecting equipment for the sheet feeding and transmitting apparatus.

Figure 1:
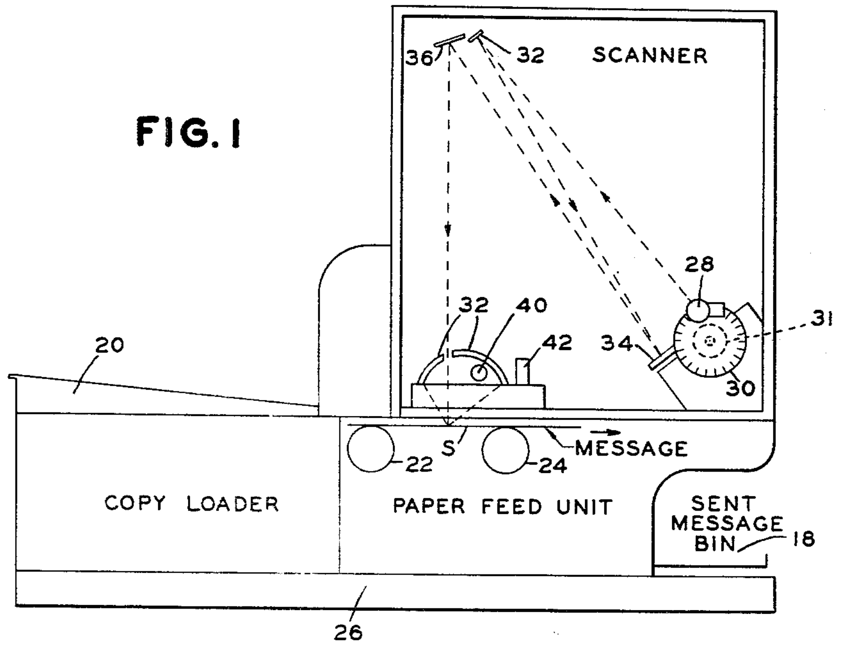

Referring to Fig. 1 of the drawings, there are schematically shown the various units of the copy loader, sheet feeding and transmitter assembly, in their operative relationship with each other. The copy loader has a loading table on which either a single message or other copy sheet, or a stack of copy sheets, may be placed for the subsequent sheet-feeding and scanning operations, and a paper feed unit automatically takes the copy sheets from the loading table one at a time for flat-bed scanning by the scanner unit of the transmitter, after which each copy sheet is delivered to a sent message bin 18. The copy loader and paper feed unit are mounted on a supporting base 26, and the scanner unit is mounted on the paper feed unit and in proper registry therewith by means of four tapered pins 27 (seen in Figs. 8, 9, and 10) which enter openings in the base of the scanner unit; the units may readily be removed and dis-associated from each other for inspection, repair or other purpose.

The copy loader has a loading table or tray 20 on which may be stored a stack of message copy sheets (not shown in Fig. 1) for advancement one at a time by an initial feed roll 22 and a second feed roll 24 (and its associated spring-loaded pressure roller 25) (shown in Figs. 11 and 12) of the paper feed unit. Each copy sheet *s* is advanced from left to right as viewed in Fig. 1 for scanning of the message or other subject matter on the upper face of the sheet, past a scanning line position in the scanner unit of the facsimile transmitter. Any of various known types of optical scanning apparatus may be employed, but preferably the scanner is of the flat-bed type, as indicated in the figure, in which the subject copy is loaded at the front, fed in flat form through the scanning mechanism, and deposited in a hopper or "sent message" bin 18 with the last transmission on top. Because the subject copy is not curved around rollers or deflectors, or otherwise distorted from its original plane, cards or inflexible sheets, as well as paper sheets, may be fed through the transmitter.

While any suitable type of optical scanning system may be employed, preferably it is of the type disclosed in an article by W. D. Buckingham, entitled "A Flat-Bed Facsimile Telegraph Transmitter," published in the Western Union Technical Review of July 1956, volume 10, pages 118–122, and also disclosed in the copending U.S. applications of Buckingham et al., Serial No. 454,750, filed September 8, 1954, now Patent No. 2,903,512, issued September 8, 1959, and Serial No. 486,252, filed February 4, 1955, both assigned to the assignee of the instant case. Such a scanning unit comprises a light source 28 which preferably is a tungsten arc lamp of a type that provides a small round spot of scanning light, and the beam from the lamp is interrupted by a light chopper disk 30 to generate a carrier frequency, usually several thousand cycles per second, that is modulated in accordance with the light reflected from the message or other copy sheet *s* being scanned. The chopper disk is rotated at the proper constant speed by a synchronous motor 31. The light beam from lamp 28, interrupted by the chopper disk, is directed by a plane mirror 32 onto an oscillatory spherical mirror 34 which is rapidly rocked back and forth by a motor and cam structure through a predetermined angle as required by the length of the scanning light track at the copy sheet, to effect transverse scanning of successive lines of the copy sheet by the light beam as the sheet is advanced by the paper feed unit during transmission of the message or other subject matter comprising the copy. From the oscillating mirror 34 the light beam is reflected by a plane mirror 36 onto the copy sheet *s* at the scanning line position and the light reflected from the copy sheet is collected by a cylindrical mirror 32 by which it is directed onto pickup photocell structure 40.

The facsimile signals generated by the photocell structure in accordance with the marked and unmarked elemental areas of the copy are amplified by an amplifier 42 and are transmitted over the outgoing circuit to a facsimile recorder. The source of light 28 and the copy sheet *s* at the scanning line where the light beam impinges thereon are positioned substantially at the optical center of curvature of the spherical mirror 34. The scanning beam is quickly returned at the end of each scanning line to the beginning of the next scanning line by means of a quick-return portion of the cam structure that rocks the oscillating mirror in order to save transmission time, and a blanking signal is automatically generated to suppress transmission of facsimile pickup signals during the return sweep of the scanning beam. Also, in the cases where a copy sheet is narrow and the scanning beam travels off the sheet, a blanking signal may be generated during such periods in any suitable manner known in the art. Various other types of scanning and transmitting apparatus may also be employed with the sheet loading and feed mechanism disclosed herein.

Figure 3:
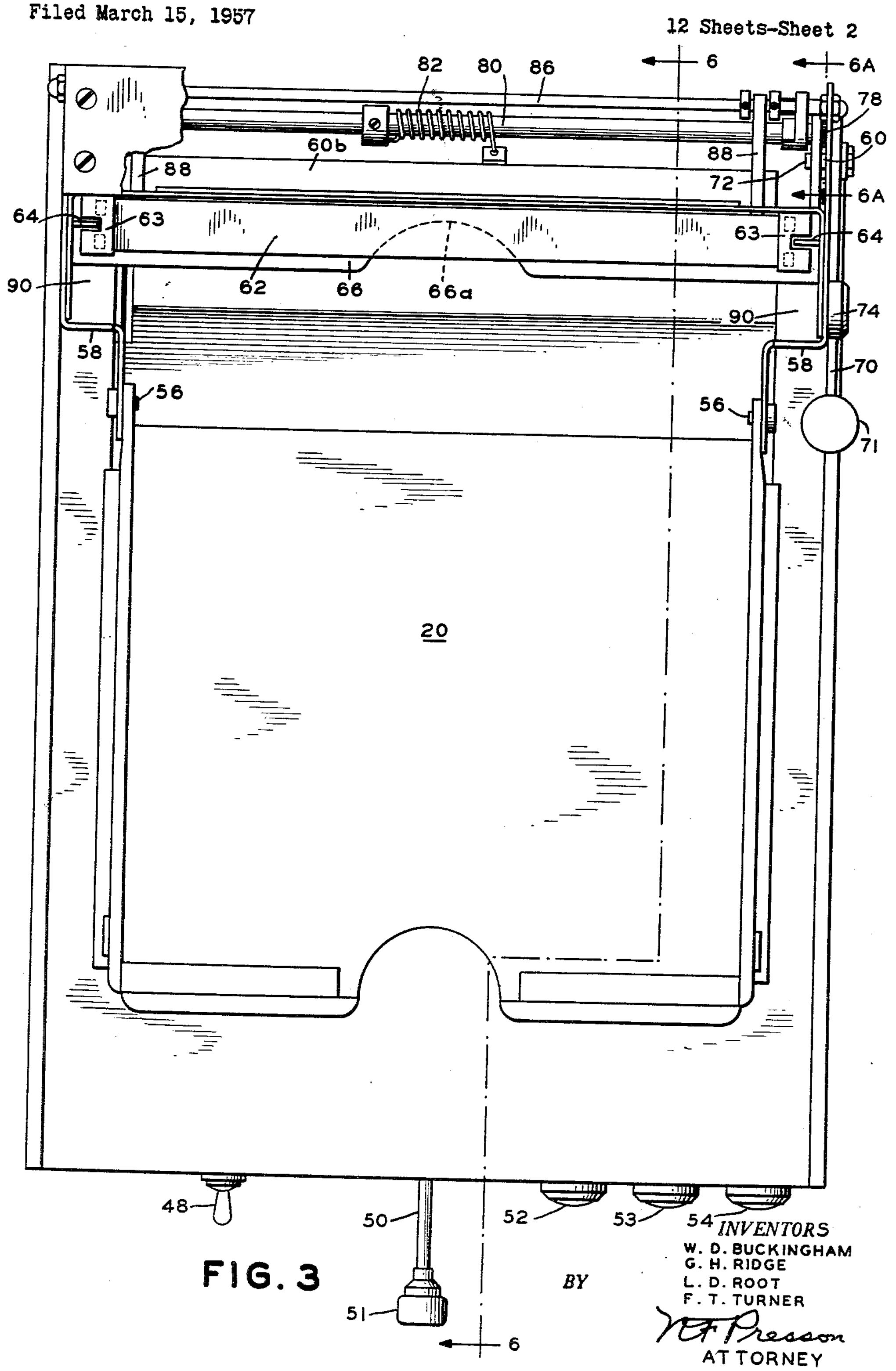
Fig. 3 is a plan view of the copy loading table or tray, and the forward portion of the associated copy sheet feeding mechanism.
Figure 4:
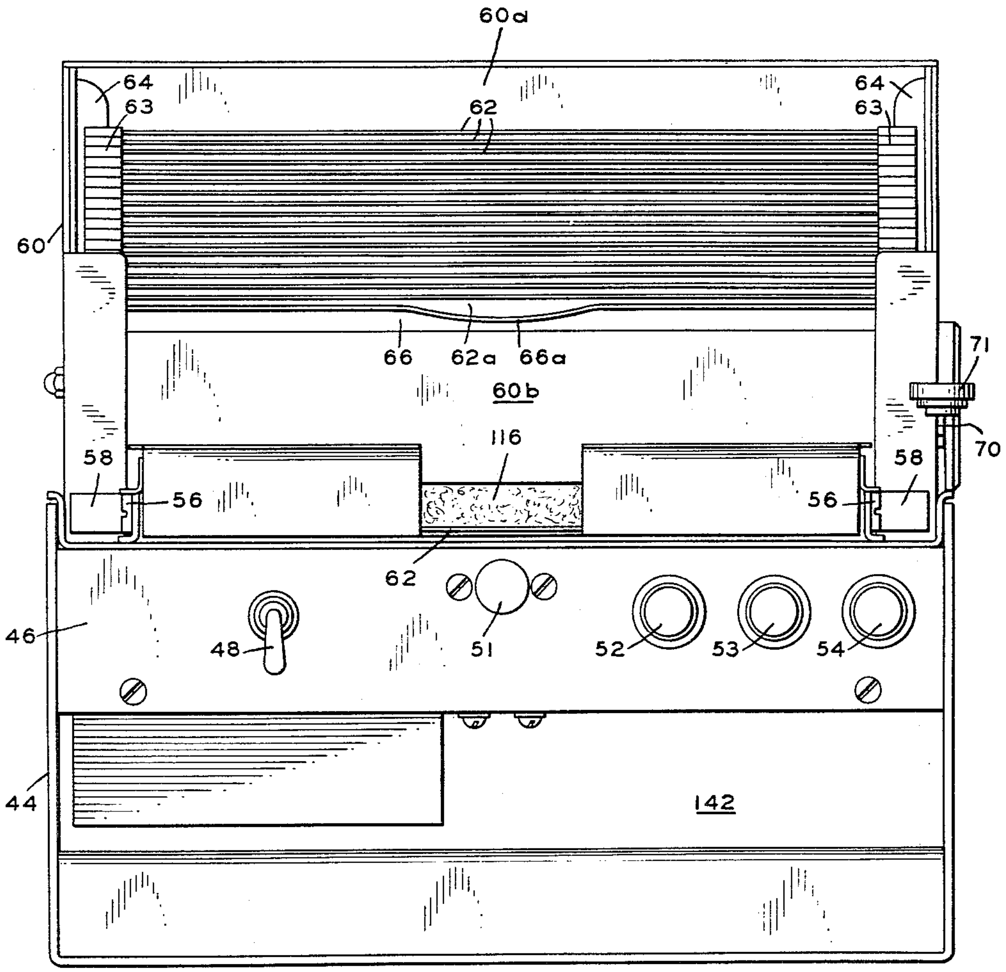
Fig. 4 is a front view in elevation of the apparatus of Fig. 3.

Figs. 3, 4, 5 and 6 show a preferred embodiment of the automatic copy feeder disassociated from the other units. Fig. 3 is a plan view looking down on the loading tray 20; Fig. 4 is a front view in elevation of the copy feeder; Fig. 5 is a plan view of the operating mechanism of the feeder; and Fig. 7 is a longitudinal sectional view of the feeder. The loader structure is contained within a housing 44; at the front of the housing is a panel 46 in which are mounted (1) a toggle switch for controlling the alternating current power supplied to the unit, (2) a push rod 50 having a knob 51, manually slidable inwardly for controlling the feeding mechanism to enable a priority message to be transmitted out of turn, (3) a signal light 52 for indicating that the unit is ready to receive the priority message, (4) a signal light 53 for indicating that the unit is feeding a copy sheet into the scanner, and (5) a signal light 54 to indicate that a copy is being transmitted. The signal lights 52, 53 and 54 preferably have different colored lamp caps, for example, red, white and green, respectively. The rear end of the loading tray 20 on which the copy sheets are stacked for automatic feeding successively into the scanner is pivotally mounted at 56 to brackets 58 secured to the housing 60 so that the tray may be manually tilted upwardly at its front end for the insertion thereunder of a priority message, as hereinafter explained.

Extending vertically at the rear of the feed unit is a housing 60 which encloses a magazine for holding a vertical stack of identical flat pressure bars 62 which in the preferred embodiment are of magnetizable material, such as steel, and which by magnetic attraction between each bar and permanent magnets embodied in the initial feed roll 22 seen in Fig. 6, acts to exert sufficient pressure on the upper surface of a copy sheet to cause it to be frictionally engaged by the rubber covered initial feed roll for feeding into the scanner. Each pressure bar is made somewhat thicker at the ends 63 thereof, as by means of small metal end pieces welded thereto, and the flat body portion intermediate the ends is sufficiently flexible so that it can be flexed downwardly by magnetic attraction to an extent to bear on the copy sheet and cause it to be gripped by the feed roll. As seen in Fig. 3 each end of the bar has a central slot so that the bars may be held in a stack by means of two vanes 64 secured to the magazine housing 60. The thickness of each vane 64 is appreciably less than the width of the end slots in the bars to facilitate manual insertion of the bars at the top of the magazine. The ends of the lowermost bar 62a of the stack rest on pairs of small rollers 68 (Fig. 6) which project slightly above the floor plate 66 of the magazine, and the floor plate has an inwardly extending curved cutout portion 66a in the front edge thereof, seen in Figs. 3 and 4, so that the stack of bars may be manually grasped from the bottom and the stack raised up or removed from the magazine, if desired. The lower ends of the holding vanes 64 stop just short of the lowermost bar of the stack so that the bar may be slid forwardly from the magazine without the possibility of any of the other bars being ejected until each of them, in turn, becomes the lowermost bar. The floor plate structure is titled downward slightly from its front to rear edges so as to prevent the lowermost bar from accidentally sliding forward from the magazine. The rollers 68 facilitate sliding of the lowermost bar 62a whenever it is to be ejected in a manner described below. The loading tray 20 and magazine structure 60 are readily removable as a unit from the housing 44.

*Operation of the automatic copy feed mechanism*

As hereinbefore stated the feeder operation is based on the use of a succession of the flat steel bars 62 instead of the idler pressure roll in conventional types of paper feed mechanisms. A manually operable lever 70 is pivotally mounted at 72 to one side of the magazine housing, as seen in Figs. 3 and 4, and indicated in dotted outline in Fig. 6. A vertically extending guide plate 74 forms a slot for guiding and limiting the extent of movement of the lever 70 about its pivot point. The rear portion of the lever has secured thereto, as by machine screws, a segment 76 of an internal gear (shown in Fig. 6A) which meshes with a gear 78 secured to a rock shaft 80, thereby to produce a step-up gear ratio to insure sufficient arcuate movement of the rock shaft in the proper direction with a given arcuate movement of the front end 70 of the manually operable lever. The ends of the shaft 80 are rotatably mounted in the opposite walls of the magazine housing, as seen in Fig. 3, and a coiled spring 82 around the shaft has the left hand end thereof secured to the shaft and the right hand end anchored to the magazine frame structure. The spring biases the shaft 80 to a position such that the lever 70 is biased to its uppermost position.

When the top 71 of lever 70 is manually depressed and the lever pushed down, the internal gear segment 76 carried by the rear portion of the lever rotates the gear 78 and hence the shaft 80, against the tension of spring 82. The shaft 80 has secured to the ends thereof, two upstanding arms 84 which rotate in unison with the shaft, and a rod 86 is secured to the upper ends of the arms. On the rod 86 are pivotally mounted two pusher rods 88, one adjacent to each side of the lowermost bar 62*a* of the stack. The rear wall portions 60*a* and 60*b*, Fig. 6, of the magazine structure have openings therein through which the forward ends of the pusher rods 88 pass to engage the rear edge of the lowermost steel bar 62*a* when the lever 70 is manually depressed by an attendant, and thereby discharge the bar 62*a* into a chute 90 through which the bar drops until its ends 63 lie flat on, and transversely across, two flat steel bars 100, Fig. 5, which bars comprise two longitudinally extending legs of a reciprocable U-shaped bar slider frame, the legs 100 each being rigidly secured at one end thereof to a transverse flat steel bar 100*a*. Directly underlying the open, or rear, ends of the legs 100 are two fixed horizontally extending guide bars 104, also of flat steel, and which are each rigidly secured at one edge thereof, as by angle irons, to the inner side of a casing or frame 47. The bars 104 provide a flat seat for the pressure bar 62*a* when the bar is in the slotted portions 100*b* of the legs such that the upper surfaces of its ends 63 lie just slightly below the upper surfaces of the legs of the slider frame.

Two other fixed, flat steel guide bars 108 directly underlie the front ends of the legs 100 at the transverse bar 100*a*. The two sets of guide bars 104 and 108 are, however, longitudinally spaced from each other a distance to provide for the operation of a slidable "priority message" frame comprising two longitudinally extending flat steel bars 106 rigidly secured to a transverse bar 106*a*, which latter frame is slidably supported on the underlying fixed flat steel bars 104. The function and manner of operation of the priority message frame is described hereinafter. Overlying the foregoing assembly are two flat top guide bars of steel each of which is rigidly secured at one edge thereof, as by welding or by angle irons, to the inner side of the casing 47. For the sake of clarity, these top guide bars, which are of the same width as the bars 104 and 108, are not shown in Fig. 5, but one of them is shown at 110 in Fig. 6. Each of these bars has a notched portion 112 through which a pressure bar may drop as described below.

In Fig. 5, the U-shaped bar slider frame 100 is shown retracted to a position where, during a cycle of operations, the ends 63 of the bar 62*a* will drop through the notched portions 112 of the top guide bars 110 above described (Fig. 6), and into two notched portions 100*b* adjacent to the rear ends of the legs 100, but at the beginning of a cycle the frame 100 is in a position such that the ends of the legs substantially coincide with the rear ends of the bars 104 at which time the slotted portions 100*b* in the legs are opposite the position indicated at "A" at the upper left hand part of the figure, and in this position the ends 63 of the pressure bar 62*a* lie on top of the legs 100. During an operating cycle of the bar slider frame 100, the frame is retracted and the slotted portions 100*b* pass the position indicated at "C" and continue to the position indicated at "B" normally for the purpose of dropping a previous bar 62 through the openings 105 into a bin 142, which bar was over the feed roll at the beginning of the cycle, as hereinafter described. However, in passing position "C" the ends 63 of bar 62*a* are prevented from dropping into the two slotted portions 100*b* of the legs by reason of the previous bar lying therein and which is being withdrawn by the frame for the dumping operation. On the return movement of the bar slider frame, the ends 63 of bar 62*a* (which are lying in the notches of the top guide bar) drop into the slotted portions 100*b* and the bar is thereby slid to position "A" for the next sheet feeding operation. Prior to this the bar 62*a* was held on the legs 100 in the position in which the bar was dropped, notwithstanding the sliding action of the slider frame, by means of the lowermost ends of the chute 60 and the notches 112 in the top guide bar, within which the bar 62*a* lies and which prevent the bar from being slid until after it has dropped into the slotted portions 100*b* of the legs of the slider frame.

When loading the feeder with a stack of copy sheets, a clerk or other attendant places a first copy sheet, with the subject matter upwards, in the loading tray 20 (Figs. 3 and 6), registering the sheet at its leading end against the end of a depending stop guide 116, Figs. 4 and 6, preferably composed of felt with a backing strip such as a plastic, which will locate the leading end of the sheet; the edge of the felt extending slightly below the backing strip has sufficient flexibility to permit the sheet to pass under when advanced by the feed roller 22 for scanning. The upper portion of the stop guide 116 is secured, in any suitable manner, to the wall portion 60*b*. A longitudinal edge of the copy sheet is registered by the left-hand side of the loading tray seen in Fig. 3. The attendant then presses down on the top 71 of the lever 70 and releases the lowermost pressure bar 62*a*, causing it to drop through the chute 90 and onto the legs 100 where it lies transversely across the copy sheet.

Next, the attendant inserts a second copy sheet in position and ejects a second pressure bar 62 (now the lowermost in the magazine) which is dropped through the chute 90 so that it lies transversely across the second copy sheet; then another copy sheet and another bar are likewise positioned, and so on, in interleaved relation, so that each copy sheet has an overlying pressure bar up to the top of the stack of messages placed in the loading tray. Due to the thicker ends 63 of each steel bar, which ends lie outside the side edges of a copy sheet, the bar does not place a drag on the adjacent copy sheet, and only when the bar is over the magnetic feed roll is the body portion of the bar between the ends thereof flexed down by magnetic attraction to bear on the underlying copy sheet and exert sufficient pressure thereon to cause gripping and advancement by the feed roll. Each copy sheet in the stack thus has a steel bar 62 lying over and transversely across the sheet. If a "priority message" sheet is inserted beneath the tray for priority transmission that sheet will also have a steel bar lying above it, as hereinafter explained.

Reverting to the initial feed roll 22, Figs. 8 and 11, the roll is fabricated about a shaft 120 and the shaft is rotatably mounted in side plates 122 and 124 of the paper feed unit; the shaft is rotated to feed a copy sheet at the proper times by means of a chain 126 and a sprocket 128. Fig. 11 shows the details of the feed roll: Mounted concentrically on the shaft 120, which is made of non-magnetic material, are assemblies of ring-shaped elements, one of such assemblies being shown in section in the figure. Element 134 is a permanent magnet in the form of a closed ring mounted within a circular member 130 of nonmagnetic material, for example, aluminum or brass. The magnet has two circular iron pole pieces 132, and is polarized axially. Elements 136 are circular end pieces of nonmagnetic material. Rods 138 of nonmagnetic material firmly clamp the elements together, as by a force fit between the rods and the elements. A rubber coating 140 provides the outer sheet-feeding surface of the roll; the coating is similar to that of a typewriter platen but the rubber composition is somewhat softer than that employed in a typewriter platen in order to provide a better friction surface for advancing the copy sheets.

It will be seen that there are circular grooves or gaps 139 in the surface coating 140, and these are provided to receive fixed tongues, such as 144 seen in Fig. 8, which strip the leading end of each copy sheet from the feed roll and guide the sheet between a pair of closely spaced plates 158 and 160. A gap 146 is provided in the feed roll assembly for receiving the actuating arm 156, Fig. 8, of a pressure-bar detecting switch 154. It is operated by the presence of a pressure bar and gives an indication to a control circuit that a bar is in position and that there is a sheet below it to be fed into the scanner.

Three other switches 166, 170 and 174 respectively have lightweight switch arms 168, 172 and 176 of small wire which are operated by a copy sheet as it is advanced through the scanner, are indicated in dotted outline in Fig. 8. These switches are mounted beneath the lower guide plate 158; the actuating arms 168 and 172 extend through openings in the guide plate so that they will be operated by the weight and stiffness of the paper to actuate the switches in succession as the sheet progresses between the guide plates. When switch arm 168 is engaged by the leading end of the copy sheet it is pushed down and switch 166 is operated to indicate to the control circuit that the copy sheet is being advanced. When switch arm 172 is pushed down by the leading end of the copy sheet, switch 170 is operated to indicate that the leading end of the sheet has reached the scanning line position. Switch arm 176 extends slightly above the rear edge of the plate 160 and is pushed down by the copy sheet and held down; when the trailing end of the sheet has passed the scanning line position the switch arm is released and rises to operate the "paper-out" switch 174 to indicate that the copy sheet has cleared the scanner. Small paper guides 162 are secured to the rear edge of the upper plate 160 to insure that the leading end of each copy sheet will enter between the pair of feed rolls 24 and 25.

An operating switch arm 180 is also seen in Fig. 8 at the left hand end of the initial feed roll 22; the switch 178 operated by arm 180 is seen in Fig. 6. When a pressure bar 62a is lying in position to be advanced over the feed roll 22 by the slider frame, the end of the bar adjacent to the switch presses the arm 180 down and the operation of the "bar-in" switch 178 indicates to the control circuit that a bar is in position for advancement and also when it is over the feed roll. The latter switch is mounted on a supporting post 182. The switch 154 will also be operated by the pressure bar when it is over the feed roll, as hereinbefore stated.

*Operation of reciprocable slider frame*

Figure 2:
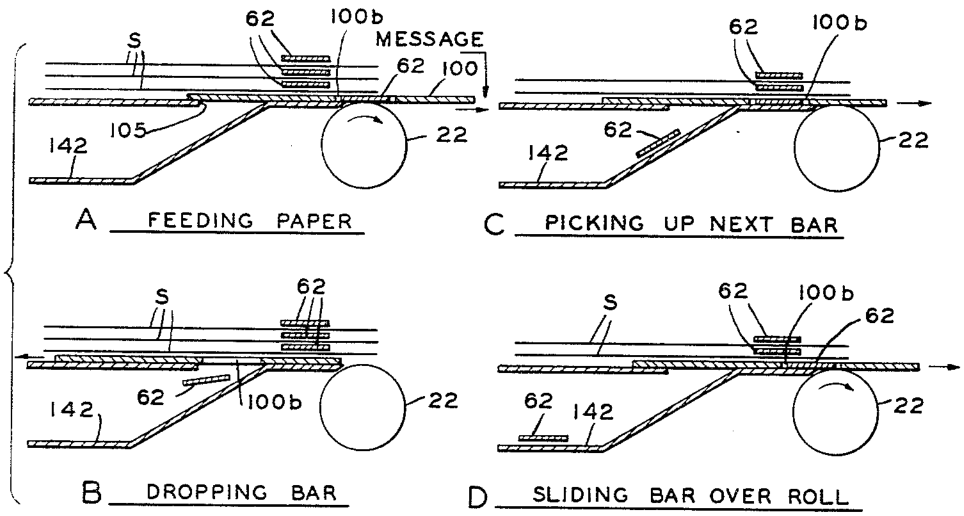

Referring to Fig. 2, four steps in the movements of the reciprocable slider frame 100 and the steel pressure bars 62 during each normal automatic copy feeding cycle are diagrammatically shown. In the first step A depicted at the upper left hand portion of the figure, one of the pressure bars 62 is positioned directly over the initial feed roll 22 and the flexible portion of the bar intermediate to its ends is attracted towards the roll by magnetic attraction and presses down on the lowermost message or other copy sheet. This forces the copy sheet into frictional driving engagement with the rubber surface of the feed roll and causes the sheet to be advanced by the feed roll into the scanner, the sheet sliding past the smooth under surface of the overlying pressure bar as the sheet is advanced. After the trailing end of the message sheet has entered the scanner, the bar slider frame 100 is automatically retracted and, as seen in step B, has slid the bar 62 back where it is dropped through the openings 105 (Figs. 5 and 6) and falls into the bin 142 (Figs. 2 and 6) which opens at the front of the loader so that the dropped bars may be recovered and again inserted in the magazine by the attendant.

In step C of Fig. 2 the slider frame has been reciprocated to a position where the next pressure bar drops into the slots in the slider frame, it being understood that the leading end of the next copy sheet is positioned between the bar and the feed roll, and position D shows the slider frame sliding the bar over the feed roll, whereupon the bar assumes the pressure position shown in Step A.

Figs. 5 and 7 show means for reciprocating the bar slider frame and also various switches employed in the control circuit hereinafter described. The underside of the transverse bar 100a of the slider frame has secured thereto, as by welding, two small angle iron brackets 186 spaced to form a longitudinal channel or slot. A circular cam member 188 has secured thereto a metal strip 190 which provides a mounting for an actuating stud 192 that works within the slot formed by the angle iron brackets. Rotation of the stud by the cam member causes the stud, acting in the slot, to reciprocate the slider frame 100 in a sheet feeding cycle when the cam is rotated through one complete revolution in the direction indicated by the curved arrow. The cam is rotated, at the proper times and at the proper speed, by a small alternating current cam motor 194, Fig. 7, acting through suitable step-down gearing shown in the figure; the cam motor and driving assembly are mounted on a supporting frame 196. The rounded outer end 190a of the strip 190 forms a cam lobe which operates to successively cam outwardly three switch arms 197, 199 and 201, respectively, of microswitches 198, 200 and 202 seen in Fig. 5, during rotation of the cam 188. When the rollers of the switch arms rest on the peripheral round edge of the cam member 188 the switches each are in one circuit-controlling position and when the lobe 190a of the cam structure engages the rollers the switches are actuated to another circuit-controlling position, such as shown by the actuated switch 198.

The switch 202 controls the small cam motor 194 that rotates the cam 188, and at the completion of a cycle of operation of the slider frame 100 for causing a message to be fed through the scanner, the frame is in its advanced position, seen in step A in Fig. 2, and in Fig. 6, with a pressure bar over the initial feed roll 22. At this time the cam 188, Fig. 5, has rotated until its lobe 190a has engaged switch arm 201 and operated the switch 202 to open the motor circuit and stop the motor. When the transmitter control circuit calls for another message, the switch 202 is short-circuited by cam-controlled contacts in the transmitter control circuit to start the cam motor 194. As soon as the cam moves, the switch is again closed and the cam motor normally will continue until the cam has made one revolution, and while making this revolution the slider frame 100 is retracted until its slotted portions 100b are in register with the openings 105 and the pressure bar 62 is dumped into the bin 142. During this withdrawal of the slider frame the next bar 62 in the chute is prevented from dropping into the slots 100b of the slider frame by reason of the former bar 62 carried at the time in the frame. After dumping the former bar the slider frame is advanced and picks up the next bar and slides it over the feed roll, and this cycle is repeated for each of the copy sheets fed into the scanner.

*Operation for a priority message*

The control rod or plunger 50, Figs. 5 and 6, is slidably mounted within a sleeve member 206 that is secured by a collar 206a to the front panel 46, and the rear end of the rod is screw-threaded into the crossbar 106a of the slidable "priority" message frame. When the rod 50 is pushed inwardly the priority message frame is thereby slid rearwardly to a position such that the crossbar, which is of magnetizable material, contacts a fixed permanent magnet 208 and the frame is held in this position by magnetic attraction. A contractile coiled spring 210 surrounds the plunger 50, one end of the spring being anchored to the sleeve member 206 and the other end of the spring being connected in any suitable manner, as by a pin, to the crossbar of the priority message frame. The spring is extended when the frame has been slid back, but the attractive force of the magnet on the bar 106a is sufficient to hold the frame in its rearward position against the tension of the spring until the plunger is manually pulled forward, at which time the spring urges the plunger outwardly to its initial position. The outward travel of the plunger is stopped when the forward ends of the legs 106 of the priority message frame abut the adjacent ends of the rear guide bars 108.

The sleeve member 206 has a notch 212 therein which receives a U-shaped latch member or staple 214 carried by an armature 216 of a latching electromagnet 218. The control rod 50 has two notches 220 and 221 therein so that when the plunger is in either of its operative positions one or the other of the notches therein will be in registry with the notch 212. Energization of the magnet will attract its armature and cause the staple to engage the aligned notches and lock the control rod so that it cannot be moved while the cam 188 is in motion, since the coil of the electromagnet 218 is connected in parallel with the cam motor and hence when the motor is energized the electromagnet is also energized.

In the rearward position of the priority message frame, i.e., with the bar 106a held against the permanent magnet 208, the rear ends of legs 106 of the frame close the openings 105 and hence when the bar slider frame 100 is retracted the pressure bar carried thereby is not dumped into the bin 142 but instead remains under the control of the frame 100.

Mounted on the underside of the crossbar 106a is a vane 224, Fig. 5, which is disposed at an angle such that when the priority message frame is retracted and in the position seen in the figure the vane engages the switch arm 225 of a transfer switch 226 to hold the switch in one circuit-controlling position. When the plunger 50 is pushed inwardly the vane moves and releases switch arm 225 so that the arm moves to the right and operates the switch to its other operative position for the purpose of transferring the control of the cam motor energizing circuit from the switch 202 to the switch 198. Now when the cam has rotated 270° from its starting position its lobe 190a raises the lever 197 and operates the switch 198 to stop the cam motor. At this point the former pressure bar (which was not dropped during retraction of the bar slider frame 100) has been advanced and stopped at position C; this is where normally a new pressure bar would have dropped into the notches 100b. The attendant can now raise the loading tray upwardly and slide the leading end of a priority copy sheet under the tray and beneath the pressure bar and over the initial feed roll 22 until the sheet is stopped by abutting the felt stop guide 116, Fig. 6.

In order to start the sheet feeding mechanism for sending the priority message, the attendant now pulls the control rod 50 outwardly, and the return of the priority message frame causes the vane 224 to cam the switch arm 225 inwardly and actuate the transfer switch 226 to its former position which, in turn, transfers control of the cam motor back to switch 202, and the cam motor starts and the cam 188 rotates 90° until its lobe 190a actuates the switch 202 to stop the motor. This rotation of the cam and the actuating pin 192 has caused the bar slider frame to position the pressure bar over the feed roll and exert pressure on the priority message sheet. As the cam 188 rotated from the 270° position, its lobe actuated the switch 200 which starts timer mechanism in the transmitter control circuit that immediately turns on the amplifier of the distant recorder to which the transmitter at the time is connected, and after allowing a short warm-up period for the amplifier the timer mechanism causes actuation of a drive motor for the feed rolls of the paper feed unit for advancement of the priority copy sheet into the scanner. When the priority copy sheet has been discharged from the transmitter, the switch 202 is short-circuited by the control circuit so that the cam motor starts on another cycle to cause the next copy sheet in the stack to be advanced through the scanner.

*Paper feed unit*

*Initial fast feed of copy sheet.*—With a copy sheet in readiness for advancement into the scanner, a fast feed motor 240 seen in Figs. 11 and 12 is energized in response to a start signal and drives the rear feed roll 24 through a train of gears 242 and the shaft 232 of the feed roll. Mounted on one end of the shaft is a sprocket 244, Fig. 10, which drives the chain 126, and the chain in turn drives the initial feed roll 22 through its sprocket 128. Proper tension is maintained on the chain 126 by an idler sprocket 246 mounted on a bracket member 248, the bracket member being pivotally mounted at 249 on the frame member 124; the bracket is rotated counterclockwise and locked in position by lock screw 247 when sufficient tension has been developed, to prevent slack in the chain 126. The feed rolls 24 and 22 are rotated at the same speed, but the outside diameter of the roll 24 is slightly larger than the diameter of the initial roll 22 thereby to cause the copy sheet to remain taut during a scanning operation.

Fast feed of the copy sheet is effected either until the leading end of the sheet reaches the scanning line position or until the initial portion of the subject-matter desired to be transmitted approaches the scanning line position, since the duration of this fast feed is timed generally in the manner disclosed in the aforesaid Buckingham et al. application Serial No. 556,197, i.e., by pin members 233 and 233′, Fig. 10, which are mounted in the hub of metering cam 234 secured to a shaft 235, which shaft is driven by the fast feed motor 240 through gearing generally indicated by reference numeral 242 seen in Fig. 12. Rotation of the fast feed motor causes the cam 234 and its pin members 233 and 233′ to rotate, in the direction of the curved arrow seen in Fig. 10, at a predetermined ratio with respect to the feed roll 22. In an idle condition of the transmitter the front pin 233 maintains a transfer switch 236 in a first circuit-controlling position as seen in the drawing. During the fast feed operation the pins 233 and 233′ are rotated from this initial position to a second position where they simultaneously operate microswitches 237 and 237′. Switch 237, which is a transfer switch, opens the energizing circuit of the fast feed motor, and thereby stops further rotation of the cam and its pins 233 and 233′.

The operation of the transfer switch 237 also closes a circuit for energizing a synchronous normal feed motor 230, Figs. 11 and 12, which through a train of reduction gears 231 drives the feed rolls 22 and 24 at the proper scanning speed which is much lower than during the fast feed operation. The switches 237 and 237′ are mounted on a plate member 238, Fig. 10, that is arcuately adjustable about the shaft 235 and is held in its adjusted position by a set screw 239, whereby the switch 237 may be adjusted to a position to effect the proper length of the arcuate path of travel of the pins 233 and 233′ between the switches 236 and 237 to correspond to the distance which the leading edge of the copy sheet travels from its initial engagement by the feed roll 22 to the scanning line position or until the initial portion of the subject matter to be transmitted approaches the scanning line position, whereupon the feed rolls are driven at the proper scanning speed by the synchronous normal speed motor 230. Mounted within each end of the feed roll 24 is an overrunning clutch (not seen) so that when the fast feed motor 240 is energized, the lower scanning speed motor 230 is in effect disconnected from the roll, and conversely when the normal feed motor is energized the fast feed motor is in effect disconnected from the roll. After the scanning operation is terminated, the roll 24 and its pressure roll 25 feed the scanned copy sheet into the "sent message" bin.

*Alternative end-of-message control.*—When transmitting a message in which the subject matter thereon is comparatively short, it is desirable to save transmission time which would be lost when scanning those portions of the copy sheet following the subject matter to be transmitted. Therefore any suitable means may be provided to cause feedout of the copy sheet as soon as the desired subject matter has been scanned. Such means may, as disclosed in the aforesaid Buckingham et al. applications, comprise an adjustable end-of-message cut-off indicator which can manually be set to correspond to the place on the copy sheet where the subject matter to be transmitted ends. Referring to Figs. 8 and 9, an end-of-message cut-off carriage 260 is slidably mounted in a T-shaped slot formed by two rail members 262. The indicator carriage is manually movable in the slot, by means of a knob 264, until a pointer 270 (when manually turned to the dotted line position shown) appears just below the last line of the subject matter on the copy sheet awaiting transmission. Initially the carriage 260 is at the end of its forward travel where it has been stopped by reason of the carriage abutting a stop member 258 seen in Fig. 8, at which time a depending lug 266 on the carriage has engaged and actuated an arm 267 of a mode-of operation switch 268, Fig. 9, to its open-circuit position. The carriage 260 is secured to an endless chain 272 and movement of the carriage causes the chain to rotate a train of gears, collectively indicated at 278 in Figs. 9 and 12, to control timer mechanism. When the end-of-message cut-off carriage 260 is in its forward position, the open-circuit, or "random," position of the switch 268 provides for continuous transmission until the trailing end of a copy sheet has passed through the scanner unit, but when the carriage is moved rearwardly and set to a desired end-of-message cut-off position the switch 268 is in its closed-circuit, or "set," position, and the timer mechanism is thereby set so that transmission will be terminated as determined by the setting of the pointer 270 on the carriage.

The timer mechanism includes a shaft 280 rotatable by the train of gears 278, which shaft has a collar 282, Fig. 12, secured thereto, and a back stop 284 is secured to the collar and rotates therewith. A timer vane 286 is secured to a disk 287, and the disk secured to a shaft 288 which is driven by a synchronous timer motor 290 through the medium of a slip clutch 292 within the motor housing. Normally the vane 286 is urged into engagement with the rotatable back stop 284 by means of a torsion spring 296 secured between the shaft 288 and a fixed anchor. The purpose of the slip clutch 292 is to permit rotation of the vane 286 by the torsion spring until it engages the back stop whenever the timer motor 290 is deenergized notwithstanding a large gear reduction in the timer motor, thereby to enable a small inexpensive timer motor to operate synchronously at relatively high speed while the shaft 288 is reduced to the proper speed by the motor gearing.

When the synchronous motor 230 is energized to feed a copy sheet at proper scanning speed through the scanner unit, the timer motor 290 is also energized and rotates the vane 286 away from its position against the settable back stop 284, and at a speed commensurate with the scanning speed of motor 230 until the vane contacts a switch arm 297 of an end-of-message switch 298 and actuates the switch. While the vane is thus rotating in one direction, the back stop is rotated in the opposite direction by the scanning motor, through the feed roll 24 and the train of gears 278, until the back stop is returned to its initial position against the fixed stop 294. Interposed between the train of gears 278 and 231 is a friction drive member 304, seen in Figs. 11 and 12, to enable the back stop 284 and the end-of-message carriage 260 to return to their initial positions before the scanning of the subject matter has been completed, the friction drive permitting continued paper feed by the scanning motor 230 after the initial positions of the back stop and carriage have been reached. If the clerk or attendant should forget to set the indicator prior to the initiation of transmission of a succeeding message the entire copy sheet will be scanned and thereby eliminate the possibility of failing to transmit a portion of the subject matter on the sheet.

The actuation of the end-of-message switch 298, Fig. 12, controls a relay circuit to remove the alternating current power from the timer motor 290 which comes to rest and terminates the scanning feed operation. As soon as the timer motor is deenergized, the torsion spring 296 returns the vane 286 to its initial position against the back stop 284 which, as previously stated, had been returned to a position against its fixed stop member 294. The operation of the switch 298 and the relay circuit controlled thereby energize the fast feed motor 240 which, through the train of gears 242, causes the feed rolls 24 and 25 to rapidly feed out the copy sheet to the sent message bin.

As hereinbefore stated, the means for causing a pressure bar to exert sufficient pressure on the underlying sheet to effect gripping and advancement thereof by the feed roll 22 preferably is obtained by means of permanent magnet structure within the feed roll 22 and the use of pressure bars composed of magnetizable material. However, the means for causing the necessary feeding pressure may embody other forms. For example, when a bar, Fig. 6, is slid over the feed roll 22, if the feed roll 22 is somewhat higher than shown, relative to the top guide strips 110, the body portion of the pressure bar 62 will bear on the underlying copy sheet *s* and feed roll with sufficient sheet-feeding pressure due to the fact that the ends **62*a* will engage the undersides of the top guide strips 110. The latter strips are secured only at one edge thereof to the casing structure, and some flexibility of their inner edge portions obtains, which facilitates the sliding of the thinner body portion of the pressure bar onto that portion of the copy sheet directly over the feed roll. The pressure bar is, in effect, wedged between the top guide strips and the sheet on the feed roll 22. If desired, the surface of the feed roll may be somewhat convex along its length in order to slightly bow up the body portion of the pressure bar and effect better gripping action on the copy sheet awaiting advancement. It will be understood that in this case the feed roll does not embody a magnet and the pressure bar need not be composed of magnetizable material. The body portion of the pressure bar intermediate the ends thereof is, however, thinner than the ends 63** in order that the pressure bar will not exert a drag on the underlying copy sheet during the time that the bar is advanced to its position over the feed roll.

Another modification for applying the necessary force to the pressure bar to effect a feeding operation is shown in Fig. 13. In this case the force applied to the pressure bar is exerted by means of two resilient springs 114 each of which is secured at one end to the depending wall portion **60*b*, and positioned so that the free curved ends of the springs will be directly over and bear upon the ends 63 of the pressure bar when the latter is in position over the feed roll 22. The top guide member 110 has notches 113** therein through which the curved ends of the springs 114 freely pass. As a pressure bar is slid into position over the feed roll 22, the ends of the bar are engaged by the springs 114 which exert sufficient resilient pressure downwardly on the ends to urge the bar towards the feed roll and cause the portion of the bar intermediate the ends to exert sufficient pressure on the underlying sheet *s* to effect gripping and advancement by the feed roll 22. Preferably the enlarged end portions 63 of the pressure bar have rounded edges so as to facilitate sliding of the ends of the bar beneath the springs 114. In this case also the feed roll is positioned upwardly a slight distance to insure that the body of the pressure bar throughout substantially its length will bear on the underlying copy sheet and feed roll may be slightly convex in configuration along its length to facilitate obtaining the desired feeding pressure.

*Control circuits for the sheet loading and feeding mechanism*

Figs. 14 and 15 together show control circuits for the automatic feeding operation of the mechanism hereinbefore described. Assuming that one or more copy sheets or other messages are in position and ready for transmission by the facsimile transmitter, the presence of the pressure bars in the chute hereinbefore described operates the bar-in switch 178, Fig. 14, in the automatic loading mechanism. When the toggle switch 48, mounted in the front wall of the housing of the loader, is closed, a circuit is completed from one side 312, Fig. 15, of a source of alternating current power, to the armature 314 and upper closed contact of a relay 316, and thence over conductor 318 to the tongue of the switch 236, Fig. 14, which is controlled by the metering cam 234, the circuit continuing through the left hand closed contact of the switch and conductor 322 to normally closed contacts 324 of a relay 326, Fig. 15, and thence through the normally closed contacts 328 of a relay 330, conductor 332, closed contacts of the bar-in switch 178, Fig. 14, through closed contacts of the transfer switch 226, through the closed toggle switch 48 to the cam motor 194 of the automatic loader, and thence over conductor 310 to the other (grounded) side of the alternating current supply.

The cam motor 194 operates and causes the loader to go through its mechanical cycle as hereinbefore described, and the movement of the cam 188 causes the end-of-cycle switch 202 to close. In this cycle the cam 188 operates the transfer switch 198 with no effect on the circuit at this time, and then operates the switch 200 which closes and completes a circuit from alternating current conductor 310, through normally closed contacts 334 of a relay 326, Fig. 15, conductor 336, through the now closed paper-in switch 154, Fig. 14, through the switch 200, conductors 338 and 341, Fig. 15, to the winding of a relay 322 in the associated control and line connecting equipment 323. From the winding of relay 322 the circuit continues over conductor 368, cam operated switch 237', and conductors 313 and 312 to the other side of the alternating current supply line. Relay 322 operates and locks up over its contacts 321 and conductor 343 to the power conductor 310. The estblishment of the operating circuit for relay 322 also operates the relay 330, which at its contacts 328 opens the energizing circuit hereinbefore described for the cam motor 194 to prevent the loader from starting another cycle until completion of transmission of the current message. At its contacts 320 the operated relay 322 supplies alternating current power over conductors 337 to the synchronous scanner motor 31. The control and line connecting equipment 323 may comprise either a manually operable concentrator arrangement in which connection to a desired recorder is made by plug and jack connections or by automatic switching apparatus in a concentrator, as is well known in the art. A circuit is temporarily maintained from power conductor 312 and the now closed end-of-cycle switch 202 until completion of the loading cycle brings the cam 188 into position to operate and reopen the switch 202, thereby opening the circuit to the cam motor and stopping the loader mechanism.

If the distant recorder is in readiness to receive, as determined by the line condition, the associated line connecting circuits in 323, after a suitable delay, cause ground potential to be applied to conductor 340 which operates the relay 316. The particular circuit arrangement for thus applying a ground potential to conductor 340 will vary depending upon the type of control and line connecting equipment employed. Since such equipment does not form a part of the instant invention, the circuit arrangement is indicated schematically by a relay 345 which is energized when the proper potential is applied to a connected outgoing facsimile circuit to indicate that the connected recorder is in readiness to receive. Energization of the relay 345 causes a ground potential to be applied through its contacts and contacts 319 of the relay 322, to the conductor 340.

The operation of relay 316 prepares a circuit from the power conductor 312, through the armature 314 and lower contact of the relay, conductor 342, to the tongue of the cam-operated switch 237, and also to the tongue of the mode-of-operation switch 268. If the latter switch 268 is in its "set" condition, that is, if the switch contacts are closed due to the position of the end-of-message carriage away from the switch, a relay 344, Fig. 15, operates over conductor 346 and the conductor 340 to ground in the control equipment 323. Relay 344 locks over its contacts 348 and power conductor 312. This relay completes a circuit through its contacts 350 and conductor 352 to the timer motor 290, Fig. 14, causing the timer motor to run for a scanning period determined by the setting of the end-of-message pointer as hereinbefore described. At the same time a circuit is completed through the tongue and left hand contact of the cam-controlled switch 237, and conductor 358 to the winding of relay 326, operating the relay. This relay, through its armature 360 and adjacent lower contact, applies power from conductor 312 to conductor 362 to energize the fast feed motor 240.

The operation of the relay 326 charged a condenser 364 through a rectifier 366. At the conclusion of the fast feed-in operation, the cam operated switch 237 operates and removes power from conductor 358 and the relay 326 causing the relay to restore and in turn remove power from the fast feed motor and also to discharge the condenser 364 through the motor to produce a dynamic braking effect and prevent excessive coasting of the motor. The cam operated switch 237' was operated to its open-circuit position, but the holding circuit for the relay 322 is continued by the end-of-message switch 298 in conjunction with one or both of the paper-operated switches 166 and 170 when closed.

Relay 326 at its now closed contacts 325, disables the shielded automatic volume control circuit 329 for the facsimile signal amplifier 331 and prevents the disturbance of the same by switching transients set up by the power-handling contacts of the relay 326. The purpose of the AVC contacts 333, which are controlled by a cam driven by the scanning motor is to insure, in the event of transmission from copy sheets of less than full width, that the AVC circuit is operative only during the initial portion of each scanning line thereby to prevent false setting of the AVC circuit when the scanning beam passes off the copy sheet. The AVC circuit maintains a constant maximum amplitude in spite of variations of the facsimile signals and notwithstanding variations in the color of the background of the copy sheet. The operation of the fast feed relay 326, at its contacts 327, shorts out the facsimile signal circuit during the entire period of the fast feed operation.

At the same time, the operation of the cam-operated switch 237, at its tongue and adjacent right hand contact, applies power from conductor 342 to the normal feed motor 230 and also through the signal lamp 54 inthe automatic loader, indicating that transmission is in progress. Phasing pulses are transmitted by phasing contacts 375 over a conductor 376 through the line connecting equipment 323. Blanking contacts 378 controlled by a cam on the motor which oscillates the scanning mirror, cause blanking pulses to be transmitted over conductors 379 and 380 and through the line connecting equipment to a facsimile recorder in known manner. During the scanning period the facsimile pickup signals are amplified by the amplifier 331 and the signals therefrom over conductors 335 are caused to modulate a carrier current for transmission over an outgoing line to the connected recorder.

Normal scanning proceeds until either:

(*a*) Operation of the end-of-message switch 298, if the mode-of-operation switch 268 was initially in its "set," or closed-circuit, condition, or (*b*) Release of both of the switches 166 and 170 previously operated by the entry of the message sheet into the scanner, if the mode-of-operation switch 268 was initially in its "random," or open-circuit, condition, or regardless of the setting of the mode-of-operation switch if the setting of the end-of-message pointer was incorrectly made for a transmission longer than the actual physical length of the message sheet.

When condition (*a*) or (*b*) obtains, a circuit is opened through conductor 368 leading to the relay 322 in the associated line control equipment, releasing relay 322 which at its contacts 321 releases relay 330, and at its contacts 319 removes ground from conductor 340 to release relay 316 and cause the release of relay 344 if operated.

Release of relay 316 establishes a circuit from the power conductor 312 through the armature 314 and upper contact, over conductor 318, to the end-of-cycle switch 236 controlled by the metering cam 234 in the scanner. This switch, being now in the released position, completes the circuit over conductor 353 to the relay 326 to operate the latter and cause the fast feed motor 230 to run as previously described.

When the cam 234 reaches the end-of-cycle position, as seen in Fig. 14, the tongue of switch 236 again engages its left hand contact. If by this time the end of the message sheet has passed the paper-out switch 174 and released the same, the operation of the switch 236 opens the circuit to fast feed relay 326. If the end of the message sheet has not yet passed and released switch 174, the circuit is maintained, permitting another complete revolution of the cam 234, and any required number of subsequent revolutions of the cam until the switch 174 is released. Release of relay 326 stops the fast feed motor as previously described. Transmission of subsequent messages will take place in the same manner.

Operation of the loading mechanism for transmission of a priority message is as follows: If at any time during a transmission the control knob 51 heretofore described is pushed in, the switch 226 is operated and the normal circuit to the cam motor 194 is open, the circuit now being maintained through the "special hold" switch 198. When the cam 188 operates switch 198, the circuit to the cam motor is opened, and the motor is stopped, leaving the loader in a position ready to receive the priority message. After inserting the message the attendant pulls out the control knob, the switch 226 is released, the circuit to the cam motor is restored and the loader cycle is completed, bringing the priority message sheet into position for transmission. The control knob is locked by the latch magnet 218 during the time that the cam motor 194 is operating, thereby preventing movement of the control knob at a time when it might cause interference with the operation of the loader.

As hereinbefore stated the copy sheet storage and associated feed mechanism are operative to cause a plurality of copy sheets stacked in a pile to be automatically gripped and advanced successively to a sheet-receiving device in the order in which the sheets are stacked and with assurance that only one sheet will be advanced at a time. In the embodiment illustrated herein the sheet-receiving device is a facsimile scanner, but it will be understood that the sheet storage and feed mechanism may advantageously be employed with various other types of sheet-receiving devices. Also, various modifications and different embodiments of the mechanisms and apparatus illustrated herein will doubtless occur to those versed in the art without departing from the spirit and scope of the instant invention which is, therefore, not to be regarded as limited except as defined in the appended claims.

What is claimed is:

1. A sheet loading and feeding mechanism in which a plurality of copy sheets stacked in a pile may automatically be advanced successively to a sheet-receiving device in the order in which the sheets are stacked, comprising a loading table for the stack, means for initially positioning the leading ends of the stacked sheets substantially in register with each other, means including a feed member having a surface for engagement with the leading portion of each sheet in turn that is currently at the bottom of the stack for advancing the sheet, a magazine for holding a plurality of pressure bars adapted to coact with said feed member, manually operable means for releasing the pressure bars one at a time from the magazine and means for positioning the released bars transversely across and over the copy sheets, respectively, as they are successively stacked so that each sheet has an overlying pressure bar adjacent thereto, means for automatically advancing each pressure bar in turn to a position over said feed member, and means for causing the pressure bar to exert sufficient pressure on the adjacent underlying sheet to effect gripping and advancement thereof by the feed member to said sheet-receiving device.

2. A sheet loading and feeding mechanism in which a plurality of copy sheets stacked in a pile may automatically be advanced successively to a sheet-receiving device in the order in which the sheets are stacked, comprising a loading table for the stack, means for initially positioning the leading ends of the stacked sheets substantially in register with each other, means including a feed member having a surface for engagement with the leading portion of each sheet in turn that is currently at the bottom of the stack for advancing the sheet, a magazine for holding a plurality of pressure bars adapted to coact with said feed member, manually operable means for releasing the pressure bars one at a time from the magazine and means for positioning the released bars transversely across and over the copy sheets, respectively, as they are successively stacked so that each sheet has an overlying pressure bar adjacent thereto, a motor and a reciprocable frame driven thereby for automatically advancing each pressure bar in turn to a position over said feed member, and means for causing the pressure bar to exert sufficient pressure on the adjacent underlying sheet to effect gripping and advancement thereof by the feed member to said sheet-receiving device, said reciprocable frame being operative to retract and release the pressure bar prior to the initiation of a succeeding sheet-feeding operation.

3. A sheet loading and feeding mechanism according to claim 2, in which the reciprocable frame is operative to retract the pressure bar remaining over the feed member after a sheet-feeding operation and release the bar and then is operative to engage a new pressure bar and advance it over the feed member for the next sheet-feeding operation.

4. A sheet loading and feeding mechanism according to claim 2, in which a priority copy sheet may be fed to the sheet-receiving device in advance of the sheets remaining in the stack on the loading table, comprising means for causing the reciprocable frame to retract to a predetermined position the pressure bar remaining over the feed member after the preceding sheet-feeding operation, means for mounting the loading table to enable it to be raised to permit the insertion of said priority copy sheet beneath the table and under the pressure bar, and means for causing the reciprocable frame member to again advance the pressure bar over the feed member to effect feeding of the priority copy sheet.

5. A sheet loading and feeding mechanism according to claim 4, including means automatically operative when the priority copy sheet has passed through said sheet-receiving device for causing the next copy sheet at the bottom of the stack to be gripped and advanced by the feed member to the sheet-receiving device.

6. Sheet loading and feeding apparatus for feeding copy sheets one at a time to an associated sheet-receiving device, comprising means for holding a stack of copy sheets and including sheet feeding mechanism automatically operative to engage the leading ends of the copy sheets of the stack one at a time and feed them successively into the sheet receiving device, said sheet feeding mechanism including a moving feed member having a surface for engagement with each copy sheet in turn that is currently at the bottom of the stack and a plurality of coacting pressure bars, means for positioning the pressure bars to cause the bars respectively to overlie the sheets in the stack in interleaved relation, means for applying a start signal to said mechanism and means responsive thereto for advancing each pressure bar in turn to a position over said feed member, and means for causing said pressure bar to exert sufficient pressure on the adjacent underlying copy sheet to effect gripping and advancement thereof by the feed member into said sheet-receiving device.

7. Apparatus according to claim 6, including means comprising a switch operable by the presence of a pressure bar when overlying a copy sheet next to be advanced for initiating a sheet-feeding cycle in response to a start signal and for preventing the initiation of a sheet-feeding cycle unless and until a pressure bar is overlying said copy sheet.

8. A sheet loading and feeding mechanism for feeding sheets one at a time to an associated sheet-receiving device, comprising means for locating a sheet in proper feeding position, a moving feed member having a surface for engagement with the sheet for advancing the same, a coacting pressure bar and guide structure therefor, means for automatically sliding said pressure bar along on said guide structure and over said sheet to a position over said feed member, and means for causing the pressure bar to exert sufficient pressure on the underlying sheet to effect gripping and advancement thereof by the feed member into said associated sheet-receiving device, said pressure bar having its end portions thicker than the portion intermediate its end portions, said thicker end portions coacting with said guide structure to prevent the intermediate portion of the bar from exerting sheet-feeding pressure on the underlying sheet until the bar is in the sheet-feeding position.

9. A sheet loading and feeding mechanism for feeding a sheet to an associated sheet-receiving device, comprising means for locating a sheet in proper feeding position, a feed roll having a surface for engagement with said sheet for advancing the same, said feed roll having a magnet embodied therein, a coacting pressure bar composed of magnetizable material, means for automatically moving said pressure bar to an operative sheet-feeding position in which it lies transversely across the sheet and over said feed roll so as to be magnetically attracted towards the feed roll and exert sufficient pressure on the underlying sheet to effect gripping and advancement thereof by the feed roll into said associated sheet-receiving device, said pressure bar being sufficiently flexible to enable a portion thereof intermediate its ends to be deflected by magnetic attraction toward the feed roll and exert sufficient pressure on the underlying sheet to effect gripping and advancement thereof by the feed roll into said associated sheet-receiving device.

10. Sheet loading and feeding apparatus for feeding copy sheets one at a time to an associated sheet-receiving device, comprising means for holding a stack of copy sheets, means for applying start signals to said apparatus, means including sheet feeding mechanism automatically operative in response to said start signals to engage each copy sheet in turn that is currently at the bottom of the stack one at a time and feed the sheets successively into the sheet-receiving device, means for causing the sheet feeding mechanism to initially operate at a fast rate for a predetermined period of time and then to operate at a lower rate for a predetermined period of time, and switch means controlled in accordance with the presence or absence of a copy sheet in the sheet-receiving device and operative in the absence of such a copy sheet to cause the sheet feeding mechanism to again operate at a fast rate immediately following the initial fast operation thereof to quickly complete the instant feeding cycle of the mechanism.

References Cited in the file of this patent

UNITED STATES PATENTS

| | | |
|---|---|---|
| 1,071,343 | Pratt | Aug. 26, 1913 |
| 1,837,241 | Van Buren | Dec. 22, 1931 |
| 2,716,548 | Fors | Aug. 30, 1955 |
| 2,757,927 | Bach et al. | Aug. 7, 1956 |
| 2,785,039 | Artzt | Mar. 12, 1957 |
| 2,805,856 | Stuchbery | Sept. 10, 1957 |
| 2,807,663 | Young | Sept. 24, 1957 |
| 2,827,291 | Wilson et al. | Mar. 18, 1958 |
| 2,880,997 | Brown | Apr. 7, 1959 |